United States Patent
Timmons

(10) Patent No.: US 9,263,720 B2
(45) Date of Patent: Feb. 16, 2016

(54) BATTERY SEPARATOR WITH GEL IMPREGNATED NONWOVEN FOR LEAD ACID BATTERY

(71) Applicant: Daramic, LLC, Charlotte, NC (US)

(72) Inventor: John R. Timmons, Owensboro, KY (US)

(73) Assignee: Daramic, LLC, Charlotte, NC (US)

( * ) Notice: Subject to any disclaimer, the term of this patent is extended or adjusted under 35 U.S.C. 154(b) by 0 days.

(21) Appl. No.: 13/973,001

(22) Filed: Aug. 22, 2013

(65) Prior Publication Data

US 2014/0057154 A1    Feb. 27, 2014

Related U.S. Application Data

(60) Provisional application No. 61/692,058, filed on Aug. 22, 2012.

(51) Int. Cl.
| | |
|---|---|
| *H01M 2/16* | (2006.01) |
| *H01M 10/06* | (2006.01) |
| *H01M 10/18* | (2006.01) |

(52) U.S. Cl.
CPC .......... *H01M 2/1633* (2013.01); *H01M 2/1646* (2013.01); *H01M 2/1666* (2013.01); *H01M 10/06* (2013.01); *H01M 10/18* (2013.01); *Y02E 60/126* (2013.01); *Y02T 10/7016* (2013.01)

(58) Field of Classification Search
CPC ............ H01M 2/1613; H01M 2/1686; H01M 2/1646; H01M 2/1666
USPC .......................................... 429/143, 144, 247
See application file for complete search history.

(56) References Cited

U.S. PATENT DOCUMENTS

| | | | |
|---|---|---|---|
| 3,351,495 A | 11/1967 | Larsen et al. | |
| 3,917,772 A | 11/1975 | Hollenbeck | |
| 4,927,722 A | 5/1990 | Bohnstedt et al. | |
| 5,230,843 A | 7/1993 | Howard et al. | |
| 5,679,479 A | 10/1997 | Young et al. | |
| 5,776,630 A | 7/1998 | Bohnstedt | |
| 5,789,103 A | 8/1998 | Young et al. | |
| 6,410,183 B2 | 6/2002 | Weerts et al. | |
| 2002/0028386 A1 | 3/2002 | Asada | |
| 2002/0106557 A1* | 8/2002 | Fraser-Bell ......... | H01M 2/1666 429/145 |
| 2002/0192562 A1 | 12/2002 | Ferreira et al. | |

(Continued)

FOREIGN PATENT DOCUMENTS

WO    WO 01/13442    2/2001

OTHER PUBLICATIONS

K. Ihmels and W. Boehnstedt, "Chapter 7—Separator Materials for Valve-Regulated Lead-Acid Batteries," Valve-Regulated Lead-Acid Batteries, Elsevier, D.A.J. Rand et al. editors, (p. 184-205), (2004).

(Continued)

*Primary Examiner* — Stewart Fraser
(74) *Attorney, Agent, or Firm* — Hammer & Associates, P.C.

(57) ABSTRACT

In one embodiment, battery separator for a lead acid battery includes a gel impregnated nonwoven. The nonwoven includes an acid dissolvable fiber and a non-acid dissolvable fiber. The gel may have a basis weight in a range of about 20-160% of the nonwoven's basis weight. In another embodiment, battery separator for a lead acid battery includes a microporous membrane with the gel impregnated nonwoven adhered thereto.

19 Claims, 1 Drawing Sheet

(56) References Cited

U.S. PATENT DOCUMENTS

2005/0130031 A1* 6/2005 Zguris .......................... 429/142
2005/0181284 A1   8/2005 Culpin
2012/0070713 A1* 3/2012 Whear et al. ................. 429/143

OTHER PUBLICATIONS

J.O. Besenhard, Editor, "Handbook of Battery Materials," Wiley-VCH Verlag GmbH (Weinheim, Germany), p. 245-292, Chapter 9, 1999.

K. Ihmels et al., "Chapter 7, Separator Materials for Valve-Regulated Lead-Acid Batteries," Elsevier B.V., 2004, D.A.J. Rand et al. editors, pp. 183-205.

Jorg Deiters et al., "A New Polyethylene Separator for Heavy-Duty Traction Batteries," Journal of Power Sources 158 (2006), Elsevier B.V., pp. 1069-1072.

M.L. Sorita et al., "Development of High Power VRLA Batteries Using Novel Materials and Processes," Journal of Power Sources 5111 (2002), Elsevier B.V., pp. 1-12.

M. Perrin et al., "Effect of Compression on the Behaviour of Lead-Acid Batteries," Journal of Power Sources 4071 (2000), Elsevier B.V., pp. 1-12.

M. Perrin et al., "Extending Cycle Life of Lead Acid Batteries: A New Separation System Allows the Application of Pressure on the Plate Group," Reference info not available.

* cited by examiner

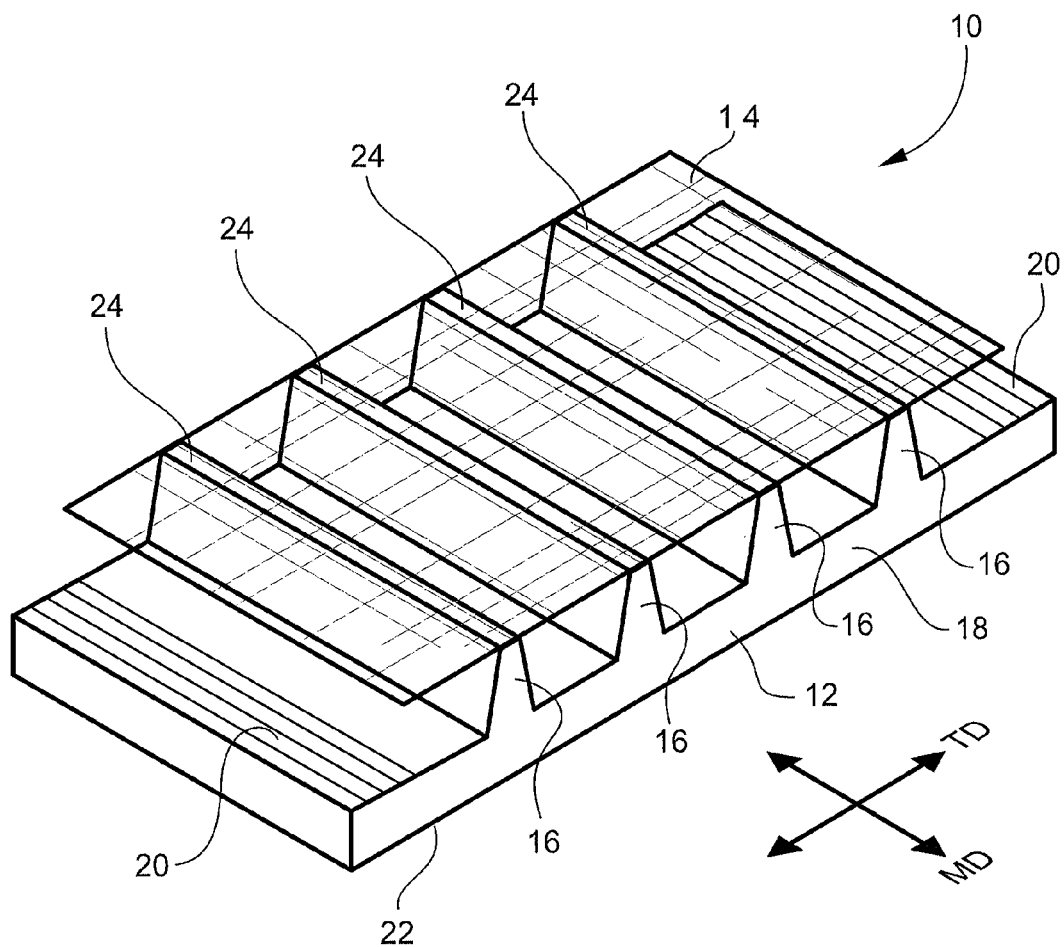

BATTERY SEPARATOR WITH GEL IMPREGNATED NONWOVEN FOR LEAD ACID BATTERY

RELATED APPLICATION

This application claims priority to and the benefit of provisional U.S. application Ser. No. 61/692,058 filed Aug. 22, 2012 which is incorporated herein by reference.

FIELD OF THE INVENTION

The invention is directed to new or improved battery separators, components, batteries, and/or related methods of production and/or use, to a battery separator with a gel impregnated nonwoven for use in a lead acid battery, to gel impregnated nonwovens, and to batteries including such separators or nonwovens.

BACKGROUND OF THE INVENTION

Lead acid batteries have evolved, over time, as the demands for a source of mobile electric power have grown. This technology is getting ready to evolve once again with the rising popularity of the hybrid electric vehicle (HEV) or 'micro HEV.' The demands on the battery for the HEV are different from those of the conventional gasoline powered vehicle. For example, the HEV's battery will operate in a partial state of charge (PSoC), approximately 50 to 80% charge. As such, the battery will undergo shallow charge/recharge cycles, and will not undergo overcharge where dissociation of water evolves hydrogen and oxygen that mixes stratified acid within the cell. Additionally, retention of active material is also an issue that must be addressed.

Accordingly, there is a need for new separator technology to meet and overcome the new challenges arising with the advent of the HEVs.

DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 1 is a schematic illustration of an embodiment of the separator of the present invention.

SUMMARY OF THE INVENTION

In one embodiment, battery separator for a lead acid battery includes a gel impregnated nonwoven. The nonwoven preferably includes an acid dissolvable fiber and a non-acid dissolvable fiber. The gel may have a basis weight in a range of about 20-160% of the nonwoven's basis weight. In another embodiment, battery separator for a lead acid battery includes a microporous membrane with the gel impregnated nonwoven adhered thereto.

DETAILED DESCRIPTION OF THE INVENTION

Referring to FIG. 1, wherein like numerals refer to like elements, there is shown a separator for a lead acid battery 10. Separator 10 may be, in one embodiment, a gel impregnated nonwoven 14, in another embodiment, separator 10 may include a microporous membrane 12 with the gel impregnated nonwoven 14 adhered thereto.

The microporous membrane 12 may be any conventional microporous membrane. In one embodiment, the membrane 12 may be the membrane conventionally used in lead acid batteries, for example those available from Daramic LLC of Owensboro, Ky. Such conventional membranes may be made of a filled polymer, where the polymer may be a polyolefin, such as ultrahigh molecular weight polyethylene (UHMWPE) and the filler is a silica, see for example U.S. Pat. No. 3,351,495; U.S. Pat. No. 3,917,772; U.S. Pat. No. 4,927,722; U.S. Pat. No 5,230,843; U.S. Pat. No. 5,679,479; U.S. Pat. No. 5,776,630; U.S. Pat. No. 5,789,103; U.S. Pat. No. 6,410,183; WO001/13,442; Besenhard, J. O., Editor, *Handbook of Battery Materials*, Wiley-VCH Verlag GmbH, Weinheim, Germany (1999), Chapter 9, pp. 245-292, which are incorporated herein by reference. These membranes may include a plurality of ribs 16 standing up on a backweb 18. The ribs 16 generally run in the machine direction (MD). The membrane 14 may also include a plurality of lateral edge ribs 20. Lateral edge ribs 20 also stand up on backweb 18, but generally have a height less than the height of ribs 16. Lateral edge ribs 20 generally run in the machine direction (MD). Membrane 12 may also include a plurality of negative cross ribs 22 (not shown). The negative cross ribs 22 stand up from the back side of the membrane (i.e., the side opposite the side with ribs 16) and generally run in the cross machine direction (TD).

The gel impregnated nonwoven 14 may be adhered to the membrane 12. Adhered, in one embodiment, refers to joined together or bonded. The nonwoven 14 may be bonded to the tops of the ribs 16. The bonds 24 may be formed by gluing and/or welding. Welding may include pressure welding, thermal welding, and/or ultrasonic welding.

The nonwoven of the gel impregnated nonwoven 14 may be any nonwoven. In one embodiment, the nonwoven may be a blend of acid dissolvable fibers and non-acid dissolvable fibers. The acid dissolvable fibers may be any fiber that is dissolvable in the acid of the battery's electrolyte (in the lead acid battery, this acid is typically sulfuric acid) and allows the gel (or its precursor) to adhere thereto. In one embodiment, the dissolvable fiber may be a cellulosic fiber, polyamide (e.g., nylon) fiber, co-polymers thereof, or blends thereof. The non-dissolvable fibers may be any fiber that is not dissolvable in the acid of the battery's electrolyte and may or may not allow the gel to adhere thereto. In one embodiment, the non-dissolvable fibers may be synthetic fibers, glass fibers, or a blend thereof. The synthetic fibers include polyolefins (e.g., polyethylene, polypropylene, polybutylene, etc.), polyesters (i.e., polyethylene terephthalate (PET), polybutylene terephthalate (PBT), etc.), acrylics, co-polymers thereof, and/or blends thereof. The weight ratio of the dissolvable fibers to the non-dissolvable fibers, in one embodiment may be in the range of about 20-80:20-80; in another embodiment, the ratio may be about 30-70:30-70; in yet another embodiment, the ratio may be about 40-60:40-60; and including all sub sets in the ranges set forth before. The basis weight of the nonwoven may be in the range of about 10-50 grams/square meter (gsm), in another embodiment, about 20-40 gsm, or another embodiment, about 25-35 gsm, and including all sub sets in the ranges set forth before. The nonwoven may have a porosity greater than about 100 $l/m^2 \cdot s$, or about 1200 $l/m^2 \cdot s$, or about 1500 $l/m^2 \cdot s$. In one embodiment, the nonwoven may be the 'pasting paper' used in the formation of the plates or electrodes of the lead acid battery. One such pasting paper is commercially available from Glatfelter GmbH as DYNAGRID NG 28.

The gel (or gelling agent) of the gel impregnated nonwoven 14 may be any material capable of forming a gel when brought into contact with the electrolyte of the battery. The gel is formed when this material is in contact with the electrolyte. These gels may be capable of surviving the electrolyte of the battery, for example having the solubility and physical adsorption properties enabling semi-dissolution resulting in gel formation and acid incorporation within the pH constraints of the battery's electrolyte. For example, the gelling agent may be applied to the nonwoven in a slurry (gelling agent), fluid (optional), and binder (optional). Then, the slurry may be dried, whereby the gelling agent is adhered to (or impregnated into) the nonwoven. When the gel impregnated separator is immersed in the electrolyte, the gelling agent adsorbs the acid of the electrolyte, swells, and thereby forms the gel. In one embodiment, the gel is a silica ($SiO_2$) based gel. The silica may be any silica including precipitated, fumed, colloidal, and/or chemically modified. In another embodiment, the gelling agent may be a silicate and/or a non-silicate mineral or chemical compound or a superabsorbent polymer.

The gel is impregnated into the nonwoven. Impregnated means that the gel is adhered to all or most of the fibers of the nonwoven, while at least some of the porosity of the nonwoven is maintained. The gel may be impregnated into the nonwoven in any manner. The gel (or its precursor) may typically be applied to the nonwoven in a non-gel state (i.e., the precursor). The gel may be applied to the nonwoven by curtain-coating, dipping, spraying, rolling, brushing, and the like. In one embodiment, the gel may comprise about 20-160 weight % of the basis weight of the nonwoven; in another embodiment, from about 25-150 weight %; in yet another embodiment, from about 40-100%; in yet another embodiment, from about 50-80%; and including all sub sets in the ranges set forth before. A binder may be added to the gelling agent (or its precursor) prior to application to the nonwoven in order to aid in the adhesion of this material to the nonwoven. The binder may be any binder. In one embodiment, the binder may be latex, polyvinyl alcohol (PVA), and combinations thereof.

In use, the gel impregnated nonwoven may be placed adjacent to (and pressed against) the positive electrode (referring to battery discharge) and the microporous membrane, if used, may be placed adjacent to the negative electrode (referring to discharge). While not being bound to any particular theory, it is believed that when the inventive separator is placed in the electrolyte of the battery, the acid dissolves away the dissolvable fibers leaving the gel intact to form a hollow tube of residual material. This hollow tube is very porous and reduces the resistance of the separator, in comparison to the gel impregnated nonwoven with the dissolvable fibers intact.

The foregoing separator may be used in any battery. In one embodiment, the battery may be a lead acid battery. The separator may be used in, for example, batteries for use in the following exemplary applications: ISS (idle stop start batteries), HEV (hybrid electric vehicle batteries), and EFB (electric fuel batteries)

EXAMPLES

The TABLE shows a comparison between nonwovens with and without gelling agent. The nonwoven used was Glatfelter's DYNAGRID 328NG pasting paper (basis weight 28 gsm) and having 40 wt % dissolvable fiber (cellulosic) and 60 wt % non-dissolvable fiber (polyester).

Each nonwoven was treated as follows: A—nonwoven without gelling agent soaked in sulfuric acid for 24 hours; B—nonwoven with 11 gsm of silica after 2 weeks in a cell; C—nonwoven with 16 gsm of silica after 2 weeks in a cell; and D—nonwoven with 21 gsm of silica after 2 weeks in a cell. Five sheets were tested and the average resistance was reported.

TABLE

| Sample | Resistance ($m\Omega \cdot in^2$) |
| --- | --- |
| A (no gelling agent) | 2.1 |
| B (11 gsm silica) | 1.3 |
| C (16 gsm silica) | 1.5 |
| D (21 gsm silica) | 2.1 |

In accordance with at least selected embodiments, aspects or objects, the present invention addresses the need for, provides or is directed to new or improved battery separators, components, batteries, and/or related methods of production and/or use, to battery separators with a gel impregnated nonwoven for use in a lead acid batteries, to gel impregnated nonwovens, and/or to batteries including such separators or nonwovens.

In accordance with at least selected embodiments, aspects or objects, the present invention addresses the need for, provides or is directed to a battery separator for a lead acid battery comprising: a gel impregnated nonwoven, said nonwoven comprising an acid dissolvable fiber and a non-acid dissolvable fiber. The above battery separator wherein said nonwoven having a basis weight and said gel having a basis weight in a range of about 20-160% of said nonwoven basis weight. The above battery separator wherein said gel being a silica gel. The above battery separator wherein said acid dissolvable fibers being cellulosic fibers. The above battery separator wherein said non-dissolvable fibers being polymer and/or glass fibers. The above battery separator wherein a weight ratio of dissolvable fiber to non-dissolvable fiber being in a range of about 20-80:20-80. The above battery separator further comprising a microporous membrane adhered to said gel impregnated nonwoven. The above battery separator wherein said membrane being a polymer filled membrane. The above battery separator wherein said polymer being a polyolefin. The above battery separator wherein said filler being a silica based material. The above battery separator wherein said membrane having ribs. The above battery separator wherein said ribs being ribs running in a machine direction and/or a cross machine direction and being on the positive or negative face. The above battery separator wherein said nonwoven being adhered to said membrane by bonding. The above battery separator wherein said bonding being gluing and/or welding. The above battery separator wherein said welding including pressure, thermal, and/or ultrasonic. In a battery, the improvement comprising the above battery separator.

A battery separator for a lead acid battery comprising: a nonwoven having non-dissolvable fibers, and tubes formed of a gel. In a battery, the improvement comprising the above battery separator.

A gel impregnated nonwoven for use in a composite battery separator for a lead acid battery such as an ISS, HEV, or EFB battery, and comprising a gel impregnated nonwoven having non-dissolvable fibers, and tubes formed of a gel. In a battery, the improvement comprising the above nonwoven.

In at least one particular embodiment, a battery separator for a lead acid battery includes a gel impregnated nonwoven. The nonwoven includes an acid dissolvable fiber and a non-acid dissolvable fiber. The gel may have a basis weight in a range of about 20-160% of the nonwoven's basis weight. In another embodiment, a battery separator for a lead acid battery includes a microporous membrane with the gel impregnated nonwoven adhered thereto.

The present invention may be embodied in other forms without departing from the spirit and the essential attributes thereof, and, accordingly, reference should be made to the appended claims, rather than to the foregoing specification, as indicated the scope of the invention.

I claim:

1. A battery separator for a lead acid battery comprising:
  a nonwoven comprising a blend of an acid dissolvable fiber and a non-acid dissolvable fiber, and a weight ratio of acid dissolvable fiber to non-acid dissolvable fiber being in a range of about 20-80:20-80; and a gel impregnated into said nonwoven.
2. The battery separator of claim 1 wherein said nonwoven having a basis weight and said gel having a basis weight in a range of about 20-160% of said nonwoven basis weight.
3. The battery separator of claim 1 wherein said gel being a silica gel.
4. The battery separator of claim 1 wherein said acid dissolvable fiber being cellulosic fibers.
5. The battery separator of claim 1 wherein said non-acid dissolvable fiber being polymer and/or glass fibers.
6. The battery separator of claim 1 further comprising a microporous membrane adhered to said gel impregnated nonwoven.
7. The battery separator of claim 6 wherein said membrane being a polymer filled membrane.
8. The battery separator of claim 7 wherein said polymer being a polyolefin.
9. The battery separator of claim 7 wherein said filler being a silica based material.
10. The battery separator of claim 6 wherein said membrane having ribs.
11. The battery separator of claim 10 wherein said ribs being ribs running in a machine direction and/or a cross machine direction.
12. The battery separator of claim 6 wherein said nonwoven being adhered to said membrane by bonding.
13. The battery separator of claim 12 wherein said bonding being gluing and/or welding.
14. The battery separator of claim 13 wherein said welding including pressure, thermal, and/or ultrasonic.
15. A battery comprising the battery separator of claim 1.
16. A battery separator for a lead acid battery comprising:
  a nonwoven comprising a blend of non-dissolvable fibers; and tubes formed of a gel.
17. A battery comprising the battery separator of claim 16.
18. A gel impregnated nonwoven for use in a composite battery separator for a lead acid battery comprising a gel impregnated nonwoven comprising a blend of non-dissolvable fibers and tubes formed of a gel.
19. A battery comprising the nonwoven of claim 18.

* * * * *